(12) United States Patent
Lin et al.

(10) Patent No.: US 7,445,727 B2
(45) Date of Patent: Nov. 4, 2008

(54) THERMAL INTERFACE MATERIAL COMPOUND AND METHOD OF FABRICATING THE SAME

(75) Inventors: Kuo-Len Lin, Wugu Township, Taipei County (TW); Tien-Chih Tseng, Wugu Township, Taipei County (TW); Ming-Chang Liu, Wugu Township, Taipei County (TW); Wen-Jung Liu, Wugu Township, Taipei County (TW)

(73) Assignee: Cpumate Inc., Taipei (TW)

( * ) Notice: Subject to any disclaimer, the term of this patent is extended or adjusted under 35 U.S.C. 154(b) by 291 days.

(21) Appl. No.: 11/530,096

(22) Filed: Sep. 8, 2006

(65) Prior Publication Data

US 2008/0061267 A1   Mar. 13, 2008

(51) Int. Cl.
*C09K 5/00* (2006.01)
(52) U.S. Cl. .................. 252/73; 428/323; 428/332; 428/334; 106/403
(58) Field of Classification Search ......... 428/320–329, 428/447, 408; 429/251; 427/180; 165/108; 252/73
See application file for complete search history.

(56) References Cited

U.S. PATENT DOCUMENTS 7,404,853 B2 *   7/2008   Kendall ................. 106/403

2005/0016714 A1 *   1/2005   Chung ................. 165/104.15
2006/0246276 A1 *   11/2006   Chung ..................... 428/323
2007/0031684 A1 *   2/2007   Anderson et al. ......... 428/447

FOREIGN PATENT DOCUMENTS

JP           2000-119643 A   *   4/2000

OTHER PUBLICATIONS

D.D.L. Chung, "Materials for Thermal Conduction", Applied Thermal Engineering, 21 (2001) 1593-1605.*
Xu et al. "Lithium Doped Polyethylene-Glycol-Based Thermal Interface Pastes for High Thermal Contact Conductance", Journal of Electronic Packaging, Transactions of the ASME, vol. 124, 2002, 188-191.*
Japanese machine translation of JP 2000-119643 A, Ishii et al. Apr. 2000.*

* cited by examiner

*Primary Examiner*—Mark Eashoo
*Assistant Examiner*—Jane L Stanley

(57) ABSTRACT

A high thermal conductivity thermal interface material compound includes 53% by weight of polyethylene glycol, 42% by weight of silicon carbide, and 5% by weight of lithium ions. The method of fabricating the thermal interface material includes the steps of: filling the above-described compound in a container and blending them to form aggregative compound by a blender; mixing the compound by a rolling machine to disperse the aggregative compound and filling the compound to another container; blending the compound and breaking the air bubble generated thereof, and pumping the air out of the container by a vacuum pump at the same time, to fabricate the high thermal conductivity thermal interface material compound without air bubbles.

7 Claims, 5 Drawing Sheets

THERMAL INTERFACE MATERIAL COMPOUND AND METHOD OF FABRICATING THE SAME

BACKGROUND

The present invention relates to a thermal interface material compound, and more particularly to a thermal interface material compound having nanoparticles and the method of fabricating the thermal interface material.

Nowadays, thermal interface material is widely used as heat conductive medium between a heat source and a heat sink. Earlier typical thermal interface material is graphite pad, and at a later time, the heat conductive adhesive is popularly used. At present, heat conductive compound is indispensable during the process of assembling the computers. The heat conductive compound is unable to dissipate heat themselves, which are used for filling up the gap between the CPU (central processing unit) and a bottom surface of the heat sink to make the heat generated by the CPU to conduct to the heat sink and dissipate there away. Therefore, the size of the particles, the heat conductivity, the oil yield efficiency, the viscosity, the density, and the conductivity are important standards of quality checking.

The conventional heat conductive compound is consisted of 50% by weight of silicate, 20% by weight of carbon compound, and 30% by weight of metal oxides. This kind of heat conductive compound is formed via repetitiously blending the thermal interface material compound and pumping at the same time. The heat conductive compound can be disposed between the CPU and the bottom surface of the heat sink to make the heat generated by the CPU to conduct to the heat sink and dissipate there away. Observing under the microscope, the cavity on the interface between the surface of the CPU and the bottom surface of the heat sink may be visible. During the heat dissipation process, the cavity on the interface may change the heat conductive path and impact the heat conductive speed. Therefore, the heat conductive compound is disposed at the interface between the CPU and the heat sink to fill up the cavity to prevent the heat conductive path from changing. However, the size of the particles of the conventional heat conductive compound is larger than 90 nm, which can not rightly fill up the cavity on the interface between the CPU and the bottom surface of heat sink. That is, even disposing this heat conductive compound between the CPU and the heat sink, the heat conductive speed is still low, and the effect of heat conduction are not as good as expected.

BRIEF SUMMARY

A thermal interface material compound having nanopartiles is provided to fill up the cavity on the interface between the surface of the CPU and the bottom surface of the heat sink to improve the effect of heat conduction.

The method of fabricating the high thermal conductivity thermal interface material includes the steps of preparing and providing a compound consisting of 53% by weight of polyethylene glycol, 42% by weight of silicon carbide, and 5% by weight of lithium ions; filling the above described compound into a container, and blending compound several minutes to preliminary blend the polyethylene glycol, the silicon carbide, and lithium ions together to form aggregative compound; dispersing the aggregative compound via a rolling machine to make the polyethylene glycol and the silicon carbide to adequately mix, the compound has viscosity after the dispersing process; filling the compound to another container, and blending the compound and breaking the air bubble generated thereof, and pumping the air out of the container by a vacuum pump at the same time, to fabricate the high thermal conductivity thermal interface material compound without air bubbles.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

A high thermal conductivity thermal interface material compound according to the present invention is consisted of: polyethylene glycol, silicon carbide, and lithium ions, which is 53% by weight of polyethylene glycol, 42% by weight of silicon carbide, and 5% by weight of lithium ions. The silicon carbide includes particles in size of 130 nm and 6 μm, in which the particle in size of 130 nm is 30% by weight therein, and the particle in size of 6 μm is 70% by weight therein. This high thermal conductivity thermal interface material compound may be used as thermal interface material to be disposed between the electronic elements and the heat sinks, or between the heat sinks and the thermal pipes to improve the heat conductive efficiency.

Figure 1:
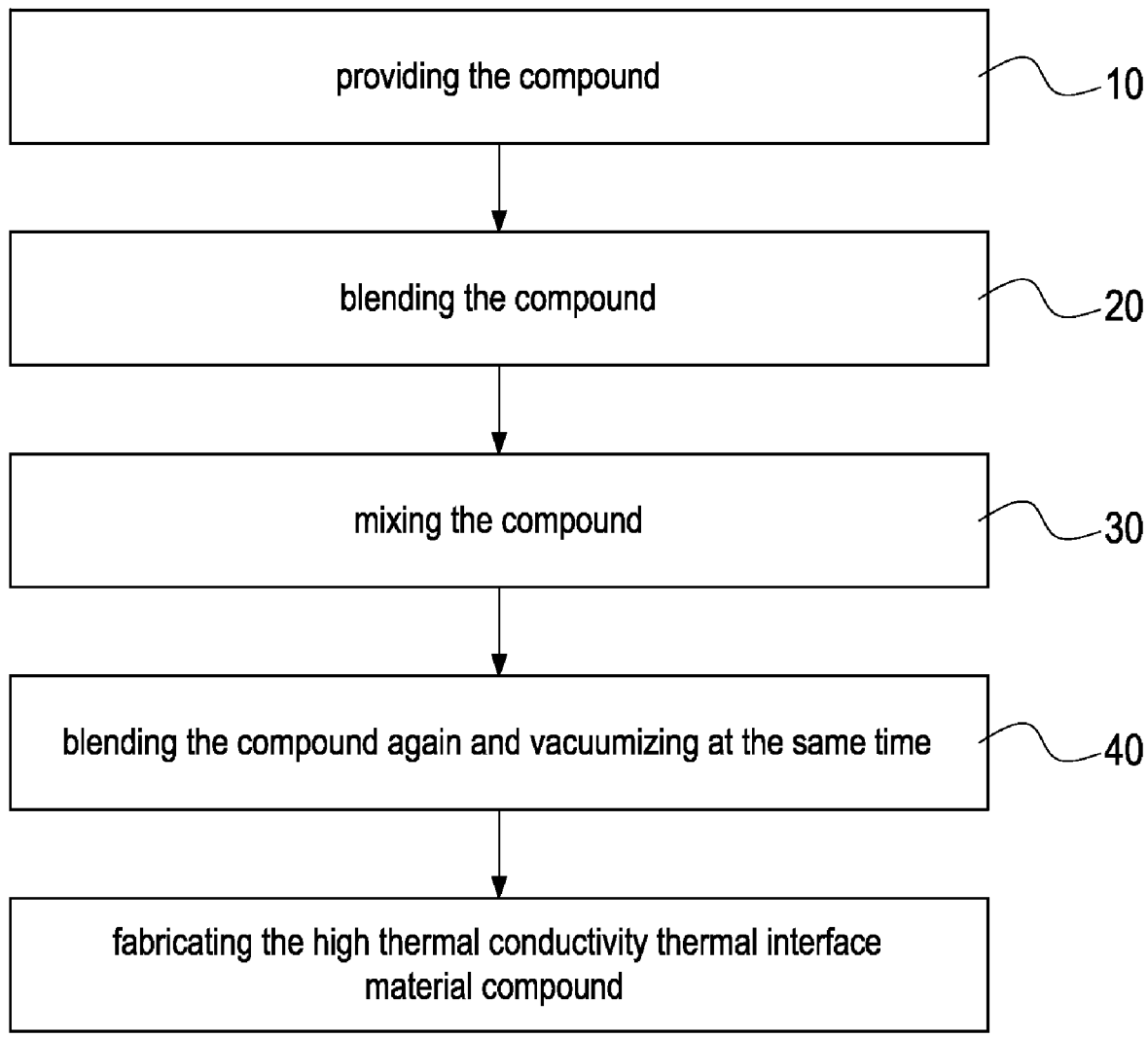
FIG. 1 is a flow chart of a method for fabricating a heat conductive compound according to the present invention.

Referring to FIG. 1, a flow chart of a method for fabricating a heat conductive compound according to the present invention is shown. During the process of fabricating the thermal interface material, the first step is to prepare and provide the compound 10. The compound is consisting of 53% by weight of polyethylene glycol, 42% by weight of silicon carbide, and 5% by weight of lithium ions. The lithium ions are used for enabling the thermal interface material having high flexibility and compressibility.

The second step is preliminary blending the compound 20. After providing the compound, then filling the compound into a container, and blending them via a blender having high torque in 20 to 30 minutes to blend the polyethylene glycol, the silicon carbide, and the lithium ions together to form the aggregative compound.

The third step is mixing the compound 30. After blending process 20, mixing the compound by a rolling machine having high torque and cutting force to disperse the aggregative compound to further mix the polyethylene glycol and the silicon carbide. After that, the compound has viscosity.

The fourth step is blending again and vacuumizing at the same time 40. Filling the compound having viscosity to another container. The mixed compound is liable to generate air bubbles, which will block the heat transmitting and impact the denseness of the mixing of the polyethylene glycol and the silicon carbide. And the ability to fill up the cavity on the interface between the CPU and the heat sink will be impacted.

Then, blending the compound and breaking the air bubble generated thereof, and pumping the air out of the container by a vacuum pump at the same time, to fabricate the high thermal conductivity thermal interface material compound without air bubbles.

Figure 2:
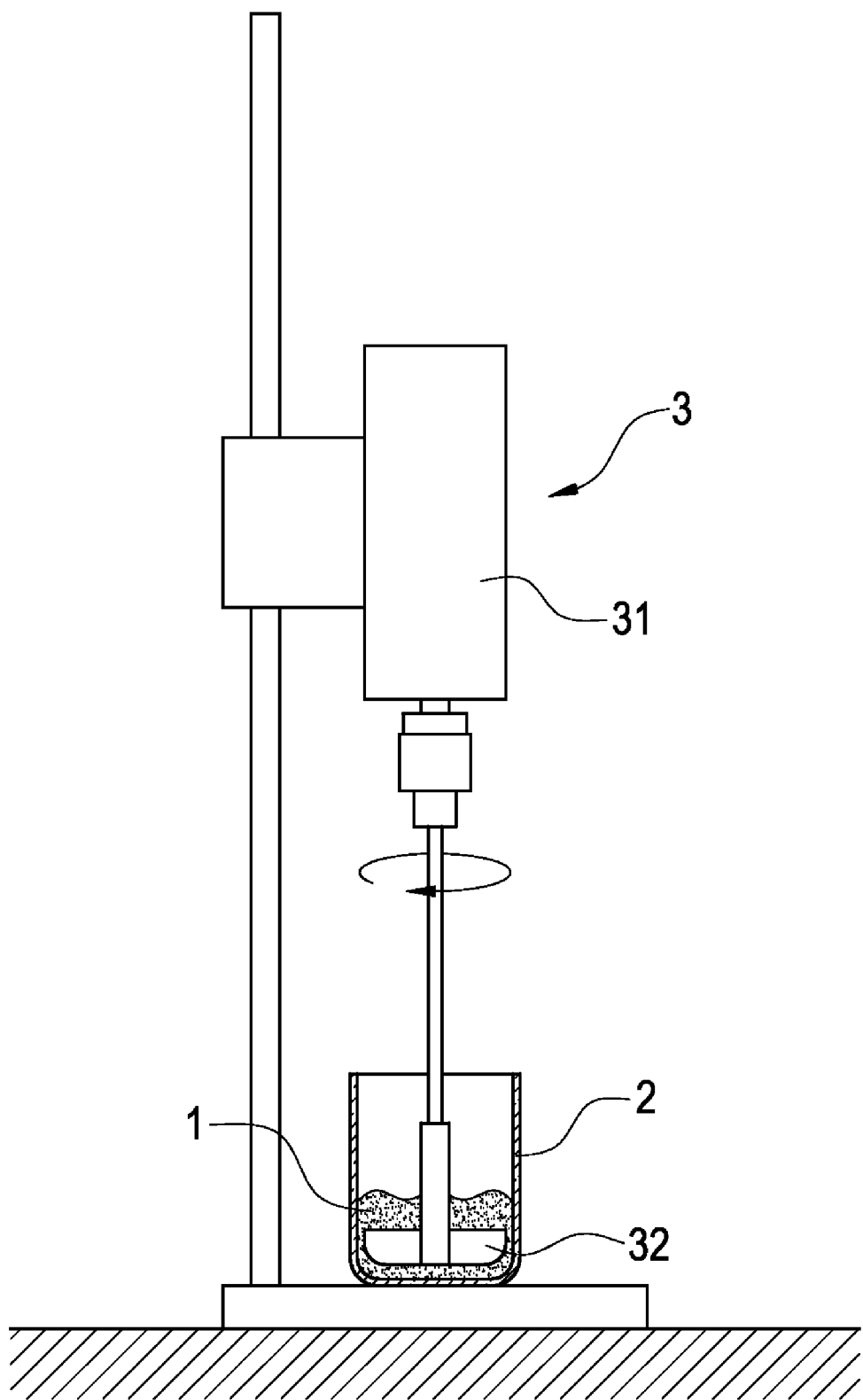
FIG. 2 is a schematic, side view of an equipment for use in a pre-blending process of the method according to the present invention.

Referring to FIG. 2, a schematic, side view of an equipment for use in a pre-blending process of the method according to the present invention is shown. After providing the compound 1, the compound 1 is filling into a container 2. The container 2 is disposed at a blending flat roof. A blender 3 is disposed on the blending flat roof, which is a blender having high torque. The blender 3 includes a motor 31, and a blending stick 32 connecting to a front end of the motor 31 and extending into the container 2. When the motor 31 is turned on, it will guide the blending stick 32 to blend compound 1 in the container 2 to form aggregative compound 1.

Figure 3:
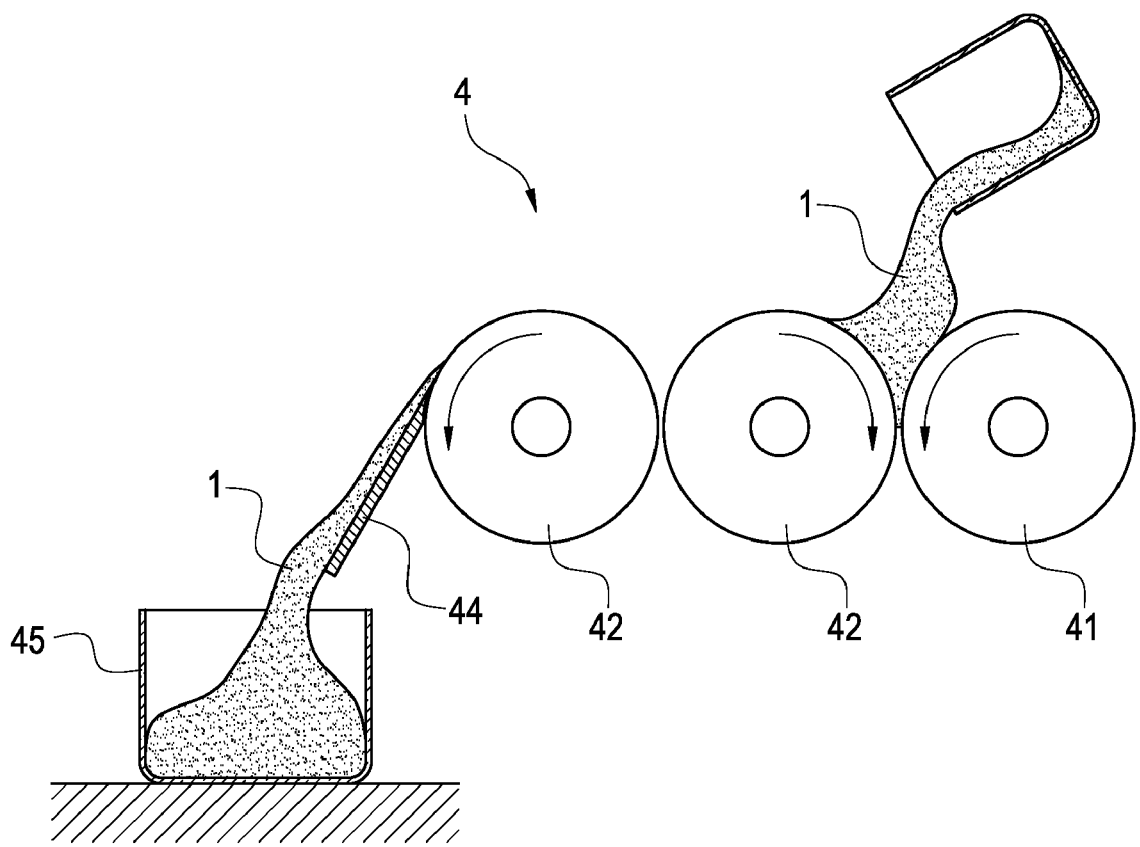
FIG. 3 is a schematic, side view of an equipment for use in a mixing process of the method according to the present invention.

Also referring to FIG. 3, a schematic, side view of an equipment for use in a mixing process of the method according to the present invention is shown. After blending the compound 1, filling the compound 1 into rolling machine 4, and then rolling the compound 1 via the first roller 41, the second roller 42, and the third roller 43 to disperse the aggregative compound 1 for sufficiently mixing the polyethylene glycol and the silicon carbide so as to make the compound having viscosity. When the compound is rolled by the third roller 43, the scraper 44 is used to scrap the compound 1 attached to a surface of the third roller 43. The compound fall down to the collecting groove 45.

Figure 4:
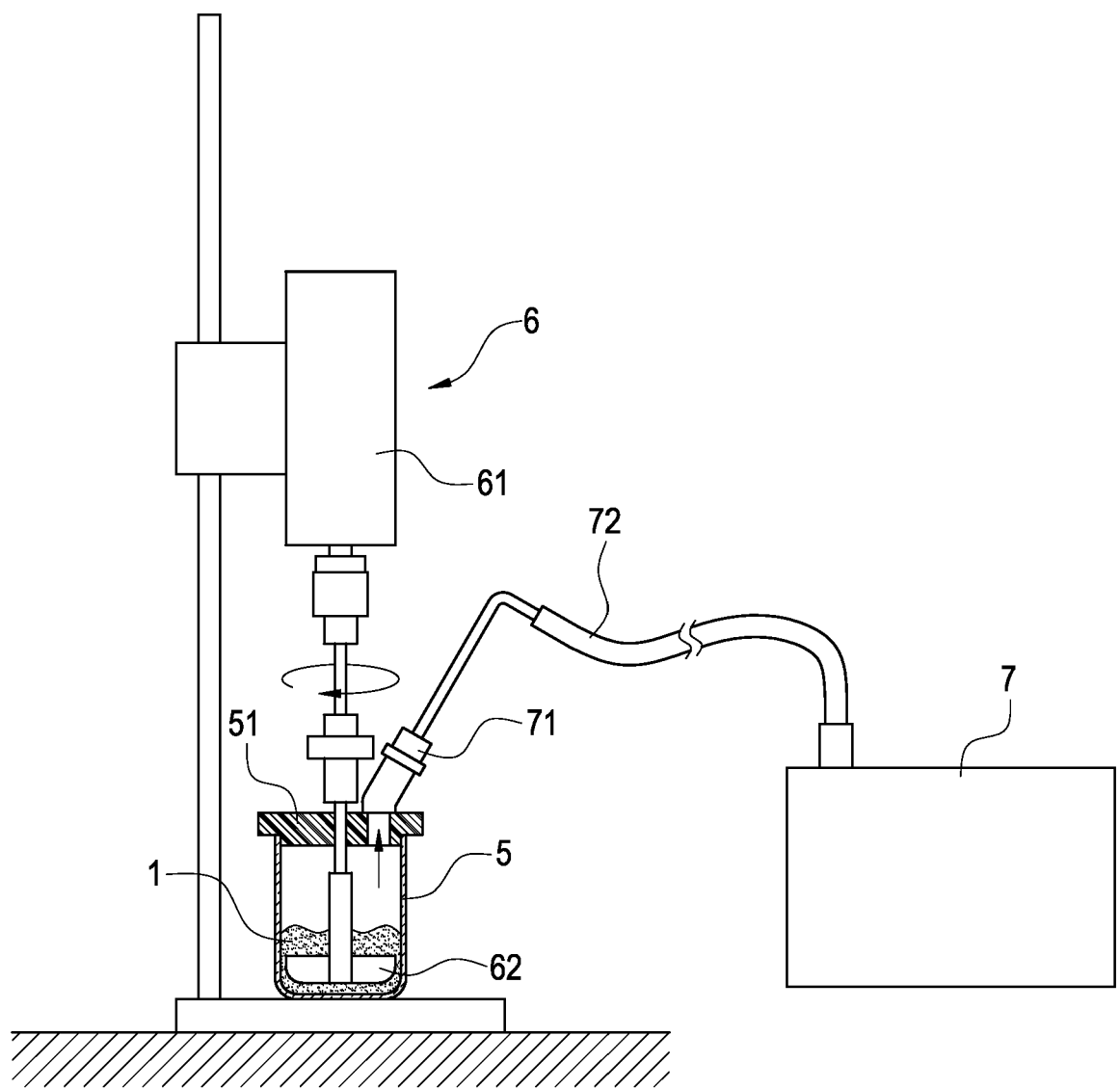
FIG. 4 is a schematic, side view of an equipment for use in a pumping process of the method according to the present invention.

Referring to FIG. 4, a schematic, side view of an equipment for use in a pumping process of the method according to the present invention is shown. After mixing, filling the compound 1 into the container 5. The container 5 is disposed on another blending plate roof, and a blender 6 is disposed thereon, which is a blender having high torque. The blender 6 includes a motor 61, and a blending stick 62 connecting to a front end of the motor 61 and extending into the container 5 through the cover 51. The cover 51 includes a connecting portion 71, a pipe 72 connecting to the connecting portion 71, and a pump 7 connecting to the pipe 72. When the motor 61 is turned on, it will guide the blending stick 62 to blend compound 1 in the container 5, meanwhile, the pump 7 pumps the air out of the container 5 to fabricate the high thermal conductivity thermal interface material compound without air bubbles. The polyethylene glycol and the silicon carbide have a good denseness. Then the ability of filling up the cavity on the interface between the CPU and the heat sink is improved, and the efficiency of heat conduction is better.

Figure 5:
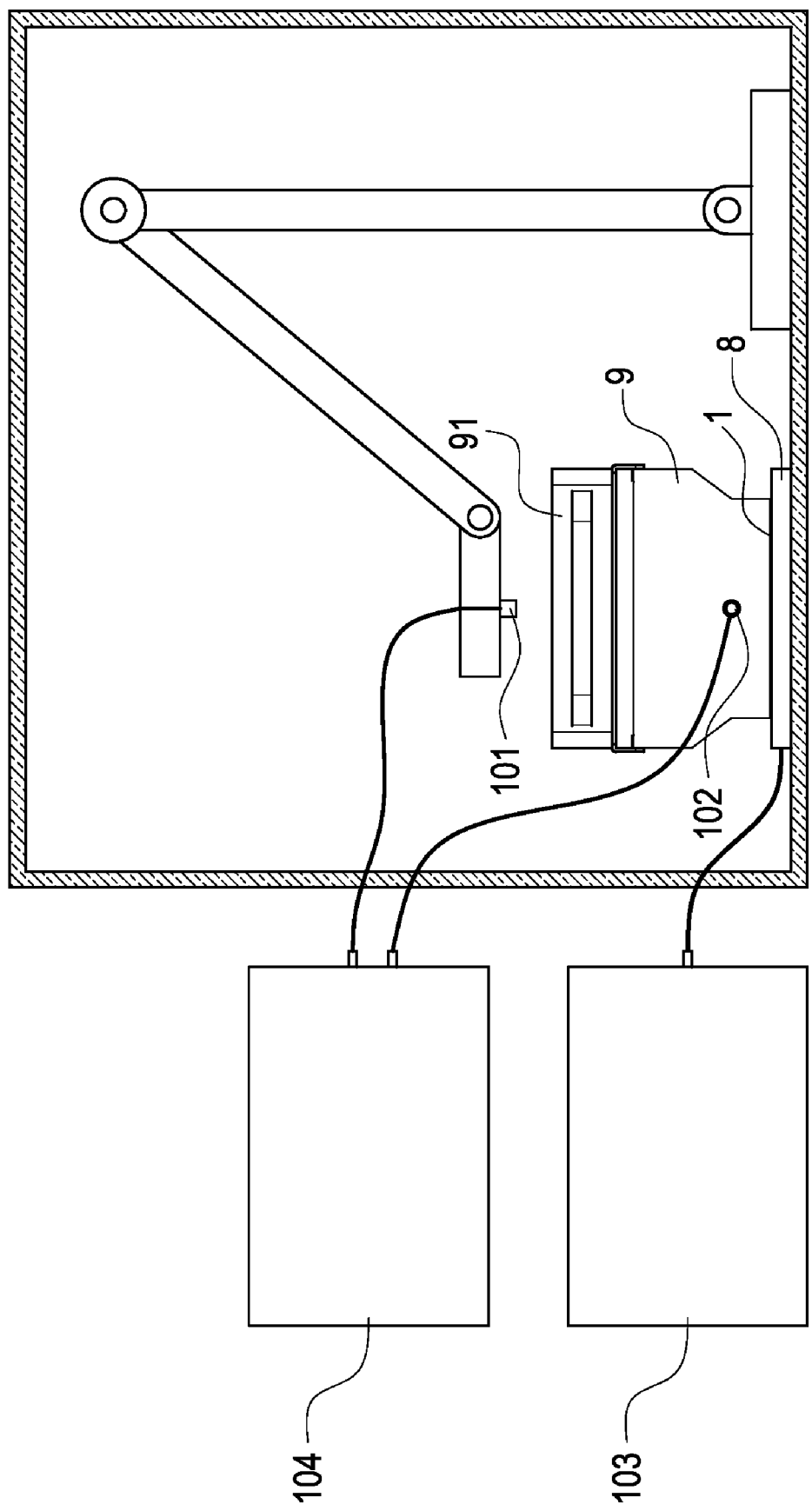
FIG. 5 is a schematic, view of measuring a thermal interface material compound according to the present invention.

Referring to FIG. 5, a schematic, view of measuring a thermal interface material compound according to the present invention is shown. After fabricating the thermal interface material compound, it needs to be measured. During the measuring process, the compound 1 is coated on the heating plate 8, and then locking the heat sink 9 and the fan 91. The temperature sensor 101 is disposed 1 centimeter right upon the fan 91, and the temperature sensor 102 is disposed in the fan 91 and adjacent to the heating plate 8.

In operation, the power supply 103 provides stable power (80 w) to heat the heating plate 8 until the system in a balanceable mode, the temperature measuring unit 104 may obtain the difference temperature of the portions that upon the heating plate 8 and the fan 91 via the temperature sensors 101 and 102. The thermal interface material compound has a viscosity in the range of 25° C.:25000~160000 cp.

Moreover, measuring the heat conductivity, heat resistance, and volatility according to 150 gram compound. The heat conductivity of the is larger than 6 w/mk; the heat resistance is less than 0.38 kcm$^2$/w; and the volatility is less than 0.5% after roasting 6 hours on 150° C.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A high thermal conductivity thermal interface material compound including 53% by weight of polyethylene glycol, 42% by weight of silicon carbide, and 5% by weight of lithium ions.

2. The high thermal conductivity thermal interface material compound as claimed in claim 1, wherein the silicon carbide comprises particles in size of 130 nm and 6 µm.

3. The high thermal conductivity thermal interface material compound as claimed in claim 2, wherein the particles in size of 130 nm are 30% by weight in the silicon carbide, and the particles in size of 6 µm are 70% by weight in the silicon carbide.

4. A method of fabricating a high thermal conductivity thermal interface material comprising the steps of:
  a) providing 53% by weight of polyethylene glycol, 42% by weight of silicon carbide, and 5% by weight of lithium ions together to form a compound;
  b) blending the compound to form aggregative compound;
  c) mixing the compound to disperse the aggregative compound;
  d) blending the compound again and vacuumizing at the same time.

5. The method of fabricating a high thermal conductivity thermal interface material as claimed in claim 4, wherein the silicon carbide comprises particles in size of 130 nm and 6 µm.

6. The method of fabricating a high thermal conductivity thermal interface material as claimed in claim 5, wherein the particles in size of 130 nm is 30% by weight in the silicon carbide, and the particles in size of 6 µm is 70% by weight in the silicon carbide.

7. The method of fabricating a high thermal conductivity thermal interface material as claimed in claim 4, wherein in step b), blending the compound in the range of 20 to 30 minutes.

* * * * *